(12) United States Patent
Mueller

(10) Patent No.: US 8,940,851 B2
(45) Date of Patent: Jan. 27, 2015

(54) HIGHLY TRANSPARENT SILICONE MIXTURES THAT CAN BE CROSS-LINKED BY LIGHT

(75) Inventor: Philipp Mueller, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/822,120

(22) PCT Filed: Oct. 19, 2011

(86) PCT No.: PCT/EP2011/068250
§ 371 (c)(1),
(2), (4) Date: Mar. 11, 2013

(87) PCT Pub. No.: WO2012/055735
PCT Pub. Date: May 3, 2012

(65) Prior Publication Data
US 2013/0200554 A1     Aug. 8, 2013

(30) Foreign Application Priority Data

Oct. 29, 2010    (DE) .......................... 10 2010 043 149

(51) Int. Cl.
| | | |
|---|---|---|
| C08G 77/08 | (2006.01) | |
| B29C 47/00 | (2006.01) | |
| C08J 3/24 | (2006.01) | |
| C08L 83/04 | (2006.01) | |
| G02B 1/04 | (2006.01) | |
| C08G 77/12 | (2006.01) | |
| C08G 77/20 | (2006.01) | |
| C08G 77/16 | (2006.01) | |

(52) U.S. Cl.
CPC ............. *B29C 47/0071* (2013.01); *C08J 3/24* (2013.01); *C08L 83/04* (2013.01); *G02B 1/04* (2013.01); *C08G 77/12* (2013.01); *C08G 77/20* (2013.01); *C08J 2383/04* (2013.01); *C08G 77/16* (2013.01)
USPC ............... 528/15; 528/32; 264/477; 264/464; 264/494; 264/495

(58) Field of Classification Search
USPC ............... 528/15, 32; 264/477, 464, 494, 495
See application file for complete search history.

(56) References Cited

U.S. PATENT DOCUMENTS

| | | |
|---|---|---|
| 5,861,457 A | 1/1999 | Weidner et al. |
| 6,251,969 B1 | 6/2001 | Woerner et al. |
| 6,274,692 B1 | 8/2001 | Herzig et al. |
| 2008/0033071 A1* | 2/2008 | Irmer et al. ................ 522/66 |
| 2010/0256300 A1 | 10/2010 | Jandke et al. |

FOREIGN PATENT DOCUMENTS

| | | |
|---|---|---|
| DE | 197 11 695 A1 | 9/1998 |
| EP | 0707028 A1 | 4/1996 |
| EP | 1006147 A1 | 6/2000 |
| EP | 2239302 A1 | 10/2010 |
| JP | 2005-194474 A | 7/2005 |
| JP | 2009-537991 A | 10/2009 |
| JP | 2009-543708 A | 12/2009 |
| JP | 2010-047646 A | 3/2010 |
| WO | 2007136956 A1 | 11/2007 |
| WO | 2008008931 A1 | 1/2008 |
| WO | 2009027133 A2 | 3/2009 |

* cited by examiner

*Primary Examiner* — Margaret Moore
(74) *Attorney, Agent, or Firm* — Brooks Kushman P.C.

(57) ABSTRACT

Silicone fibers suitable for use as optical fibers are prepared by crosslinking an extruded mixture of a silicone resin and an organopolysiloxane, both containing aliphatically unsaturated groups, an organopolysiloxane bearing Si—H groups, and a light activatable trimethyl(methylcyclopentadienyl) platinum catalyst.

19 Claims, No Drawings

HIGHLY TRANSPARENT SILICONE MIXTURES THAT CAN BE CROSS-LINKED BY LIGHT

CROSS-REFERENCE TO RELATED APPLICATIONS

This application is the U.S. national phase of PCT Appln. No. PCT/EP2011/068250 filed Oct. 19, 2011 which claims priority to German application 10 2010 043 149.4 filed Oct. 29, 2010, the disclosures of which are incorporated in their entirety by reference herein.

BACKGROUND OF THE INVENTION

1. Field of the Invention

The invention relates to a silicone mixture crosslinkable under the influence of light and having high initial strength, and to a process for producing a silicone fiber from the silicone mixture.

2. Description of the Related Art

For the ultrafast transport of electronic data over large distances, optical fibers are increasingly being used. The demands on optical purity are very high, since every single particle leads to scattering losses which, accumulated over the transport distance, lead to great losses and possibly incorrect data. For the production of the correspondingly required high-transparency optical fibers from silicone, there has to date been no suitable extrusion process, since the transparent, filler-free, silicone resin-reinforced silicone formulations do not have sufficient initial strength (green strength) to enable a continuous production process with conventional extrusion technology.

Tubes or fibers made from silicone are produced by extrusion. This involves extruding the crosslinkable formulations through a shaping die in a continuous process and then vulcanizing in a heating tunnel at temperatures above 200° C. In order that the pipe does not break off and retains its geometry at the high crosslinking temperatures, silicone formulations with high green strength are required for this purpose. The high green strength is achieved by means of correspondingly high-viscosity HTV silicone polymers having chain lengths of typically 5000 with simultaneous addition of finely divided silica (HDK® silica). The HDK silica has additional thickening action and is necessarily required in order to obtain sufficient green strength for shape retention and thermal vulcanization.

WO 2009/027133 describes light-activatable silicone mixtures for extrusion of moldings. These silicone mixtures contain ultrahigh-viscosity silicone polymers with chain lengths greater than 3000, in order to achieve, in combination with the HDK filler, sufficient green strength with a high Mooney viscosity of greater than 10. The formulations described cannot be used to produce high-transparency silicone moldings, since the filler scattering losses are too high.

SUMMARY OF THE INVENTION

The invention provides a silicone mixture crosslinkable under the influence of light, comprising
(A) an organosiloxane resin formed from units of the general formulae I, II, III and IV $$R_3SiO_{1/2} \quad (I),$$

$$R_2SiO_{2/2} \quad (II),$$

$$RSiO_{3/2} \quad (III),$$

$$SiO_{4/2} \quad (IV),$$

in which
R represents saturated hydrocarbyl radicals optionally substituted by halogens and having 1-40 carbon atoms, or —OH,
with the proviso that
at least 20 mol % of the units are selected from units of the general formulae III and IV,
at least 2 of the R radicals are alkenyl radicals having 2-10 carbon atoms and
at most 2% by weight of the R radicals are —OH radicals,
(B) a polyorganosiloxane containing at least two alkenyl groups per molecule and having a chain length of the longest chain of 200 to 10,000 siloxy units,
(C) an organosilicon compound containing at least two SiH functions per molecule and
(D) a catalyst from the platinum group activatable by light from 200 to 500 nm.

DETAILED DESCRIPTION OF THE PREFERRED EMBODIMENTS

The silicone mixture has a sufficient initial strength (green strength), with which long silicone fibers can be extruded and then cured with light at low temperature. At the same time, the silicone mixture has excellent transparency which makes them suitable for optical fibers.

The hydrocarbyl radicals R may be halogen-substituted, linear, cyclic, branched, aromatic, saturated or unsaturated.

Examples of unsubstituted R radicals are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical; cycloalkyl radicals such as cyclopentyl, cyclohexyl, 4-ethylcyclohexyl, cycloheptyl, norbornyl and methylcyclohexyl radicals; aryl radicals such as the phenyl, biphenylyl, and naphthyl radicals; alkaryl radicals such as the o-, m-, p-tolyl radicals and ethylphenyl radicals; aralkyl radicals such as the benzyl radical and the alpha- and the β-phenylethyl radicals.

Examples of substituted hydrocarbyl radicals as R radicals are halogenated hydrocarbons, such as the chloromethyl, 3-chloropropyl, 3-bromopropyl, 3,3,3-trifluoropropyl and 5,5,5,4,4,3,3-hexafluoropentyl radical, and the chlorophenyl, dichlorophenyl and trifluorotolyl radical.

The hydrocarbyl radicals R preferably have 1 to 6 carbon atoms, particular preference being given to alkyl radicals and phenyl radicals. Preferred halogen substituents are fluorine and chlorine. Particularly preferred monovalent hydrocarbyl radicals R are methyl, ethyl, and phenyl.

The alkenyl groups R are amenable to an addition reaction with the SiH functions of the organosilicon compound (C). Typically, alkenyl groups having 2 to 6 carbon atoms, such as vinyl, allyl, methallyl, 1-propenyl, 5-hexenyl, ethynyl, butadienyl, hexadienyl, cyclopentenyl, cyclopentadienyl, cyclohexenyl, preferably vinyl and allyl, are used.

The organosiloxane resins (A) preferably contain at least 30 mol %, especially at least 40 mol %, and preferably at most 80 mol %, especially at most 70 mol %, of units of the general formulae III and IV.

The organosiloxane resins (A) are preferably MQ silicone resins (MQ) containing at least 80 mol % of units, preferably at least 95 mol % and especially at least 97 mol % of units of the general formulae I and IV. The average ratio of the units of the general formulae I to IV is preferably at least 0.25, especially at least 0.5 and preferably at most 2, more preferably at most 1.5.

Preferably at most 1% by weight, especially at most 0.5% by weight, of the R radicals are OH radicals.

Preferably at least 0.1 mol %, more preferably at least 0.5 mol %, and most preferably at least 2 mol %, and preferably at most 20 mol %, especially at most 10 mol %, of the R radicals are alkenyl radicals having 1-10 carbon atoms.

The average molecular weight Mn of the organosiloxane resins (A) is preferably at least 200 g/mol, especially at least 1000 g/mol, and preferably at most 100,000 g/mol, especially at most 20,000 g/mol.

The composition of the polyorganosiloxane (B) containing alkenyl groups preferably corresponds to the average general formula V $$R^1_x R^2_y SiO_{(4-x-y)/2} \quad (V)$$

in which
$R^1$ is a monovalent, optionally halogen- or cyano-substituted, $C_2$-$C_{10}$ hydrocarbyl radical optionally bonded to silicon via an organic divalent group and containing aliphatic carbon-carbon multiple bonds,
$R^2$ is a monovalent, optionally halogen- or cyano-substituted, SiC-bonded $C_1$-$C_{10}$ hydrocarbyl radical free of aliphatic carbon-carbon multiple bonds,
x is a non-negative number such that at least two $R^1$ radicals are present in each molecule, and
y is a non-negative number such that (x+y) is in the range from 1.9 to 2.2, preferably 1.99 to 2.05.

Preferably, the chain length of the longest chain of the polyorganosiloxane (B) is at least 300 and at most 200 to 7000 siloxy units.

Examples and preferred alkenyl groups $R^1$ have been listed above for R radical. Particularly preferred alkenyl groups $R^1$ are vinyl and allyl.

The $R^1$ radicals may be bonded in any position of the polymer chain, especially to the terminal silicon atoms.

Examples of unsubstituted and substituted $R^2$ radicals have been listed above for R radicals.

$R^2$ has preferably 1 to 6 carbon atoms. Methyl and phenyl are especially preferred.

Constituent (B) may also be a mixture of various polyorganosiloxanes which contain alkenyl groups and differ, for example, in the alkenyl group content, the nature of the alkenyl group or structurally.

The structure of the polyorganosiloxanes (B) containing alkenyl groups may be linear, cyclic or else branched. The content of tri- and/or tetrafunctional units which lead to branched polyorganosiloxanes is typically very low, preferably at most 1 mol %, especially at most 0.1 mol %.

Particular preference is given to the use of polydimethylsiloxanes containing vinyl groups, the molecules of which correspond to the general formula VI $$(ViMe_2SiO_{1/2})_2(ViMeSiO)_p(Me_2SiO)_q \quad (VI)$$

where the non-negative integers p and q satisfy the following relations: p≥0, 200<(p+q)<10,000, preferably 500<(p+q)<2000, and p:(p+q)<0.2, preferably <0.02, especially <0.001.

The viscosity of the polyorganosiloxane (B) at 25° C. is preferably 0.5 to 100,000 Pa·s, especially 1 to 2000 Pa·s.

Organic divalent groups via which the alkenyl groups Fe may be bonded to silicon in the polymer chain are preferably divalent $C_1$-$C_{10}$ hydrocarbyl radicals.

The silicone mixture preferably contains, for every 100 parts by weight of organosiloxane resin (A), at least 10 parts by weight, more preferably at least 25 parts by weight, especially at least 40 parts by weight, and preferably at most 90 parts by weight, more preferably at most 80 parts by weight, and especially at most 70 parts by weight, of polyorganosiloxane (B).

The organosilicon compound (C) containing at least two SiH functions per molecule preferably has a composition of the average general formula VII $$H_a R^3_b SiO_{(4-a-b)/2} \quad (VII)$$

in which
$R^3$ is a monovalent, optionally halogen- or cyano-substituted, SiC-bonded $C_1$-$C_{18}$ hydrocarbyl radical free of aliphatic carbon-carbon multiple bonds and
a and b are non-negative integers,
with the proviso that 0.5<(a+b)<3.0 and 0<a<2, and that at least two silicon-bonded hydrogen atoms are present per molecule.

Examples of $R^3$ are the radicals specified for R and $R^2$. $R^3$ preferably has 1 to 6 carbon atoms. Methyl and phenyl are especially preferred.

Preference is given to the use of an organosilicon compound (C) containing three or more SiH bonds per molecule. In the case of use of an organosilicon compound (C) having only two SiH bonds per molecule, it is advisable to use a polyorganosiloxane (B) having at least three alkenyl groups per molecule.

The hydrogen content of the organosilicon compound (C), which is based exclusively on the hydrogen atoms bonded directly to silicon atoms, is preferably in the range from 0.002 to 1.7% by weight of hydrogen, more preferably from 0.1 to 1.7% by weight of hydrogen.

The organosilicon compound (C) preferably contains at least three and at most 600 silicon atoms per molecule. Preference is given to the use of organosilicon compound (C) containing 4 to 200 silicon atoms per molecule.

The structure of the organosilicon compound (C) may be linear, branched, cyclic or network-like.

Particularly preferred organosilicon compounds (C) are linear polyorganosiloxanes of the general formula VIII $$(HR^4_2SiO_{1/2})_c(R^4_3SiO_{1/2})_d(HR^4SiO_{2/2})_e(R^4_2SiO_{2/2})_f \quad (VIII)$$

where
$R^4$ is as defined for $R^3$ and
the non-negative integers c, d, e and f satisfy the following relations: (c+d)=2, (c+e)>2, 5<(e+f)<200 and 1<e/(e+f)< 0.1.

The SiH-functional organosilicon compound (C) is preferably present in the crosslinkable silicone mixture in such an amount that the molar ratio of SiH groups to alkenyl groups is 0.5 to 5, especially 1.0 to 3.0.

The catalysts (D) used may be all known catalysts from the platinum group which catalyze the hydrosilylation reactions which proceed in the course of crosslinking of addition-crosslinking silicone materials and are activatable by light from 200 to 500 nm.

The catalyst (D) contains at least one metal or one compound of platinum, rhodium, palladium, ruthenium and iridium, preferably platinum.

Particularly suitable catalysts (D) are cyclopentadienyl complexes of platinum. A particularly preferred catalyst (C) is MeCp(PtMe₃).

Catalyst (D) can be used in any desired form, for example including the form of microcapsules containing hydrosilylation catalyst, or organopolysiloxane particles, as described in EP-A-1006147.

The content of hydrosilylation catalysts (D) is preferably selected such that the silicone mixture has a content of platinum group metal of 0.1-200 ppm, preferably 0.5-40 ppm.

The silicone mixture is transparent and preferably contains not more than 2% by weight, more preferably not more than 0.5% by weight and especially not more than 0.01% by weight of light-scattering fillers having a diameter of more than 50 nm.

The silicone mixtures may comprise, as constituent (E), further additives in a proportion of up to 70% by weight, preferably 0.0001 to 40% by weight. These additives may, for example, be resinous polyorganosiloxanes other than the polyorganosiloxanes (A), (B) and (C), dispersing aids, solvents, adhesion promoters, dyes, plasticizers, organic polymers and heat stabilizers. Furthermore, thixotropic constituents may be present as constituent (E).

In addition, siloxanes of the formula $HSi(CH_3)_2$—$[O$—$Si(CH_3)_2]_w$—$H$ may also be present as chain extenders, where w represents values of 1 to 1000.

It is additionally possible for additives (E) which serve for control of processing time, onset temperature and crosslinking rate of the silicone mixture to be present.

These inhibitors and stabilizers are very well-known in the field of crosslinking materials.

In addition, it is also possible to add additives which improve the compression set. In addition, it is also possible to add non-vinyl-functionalized polydiorgano-siloxanes.

The silicone mixture preferably has a viscosity [D=0.5 l/s/25° C.] of at least 100 Pas, more preferably at least 500 Pas, especially at least 1000 Pas, and preferably at most 500,000 Pas, especially at most 10,000 Pas.

The compounding of the silicone mixture is effected by mixing the components listed above in any sequence.

The invention also provides a process for producing a silicone fiber, in which the above silicone mixture is extruded continuously through a die onto a conveyor belt and is activated and vulcanized with a UV light source having a wavelength of 200-500 nm, especially 250-350 nm.

The dose in the activation with light is preferably at least 0.1 J/cm$^2$, more preferably at least 0.5 J/cm$^2$, and preferably at most 20 J/cm$^2$, more preferably at most 10 J/cm$^2$.

At the end of the conveyor belt, the high-transparency silicone fiber can be removed directly or optionally be cured by heating, for example by being passed through a heating tunnel.

The extrusion takes place preferably at at least 0° C., more preferably at least 10° C., especially at least 15° C., and preferably at at most 50° C., more preferably at most 35° C., and especially at most 25° C.

The activation of the extruded silicone mixture with light preferably takes at least 1 second, more preferably at least 5 seconds, and preferably at most 500 seconds, more preferably at most 100 seconds.

The onset of the hydrosilylation reaction begins the crosslinking of the silicone mixture.

The curing takes place preferably at at least 10° C., more preferably at least 20° C., and preferably at most 60° C., more preferably at most 40° C., and especially at most 30° C.

If a silicone which does not cure through the influence of light were to be used in place of the silicone mixture, the viscosity of the mixture would fall during the heating from room temperature to the target temperature required for curing, and it would creep. Continuous production of a fiber with homogeneous geometry would be impossible.

All above symbols in the above formulae are each defined independently of one another. In all formulae, the silicon atom is tetravalent.

In the examples which follow, unless stated otherwise in each case, all stated amounts and percentages are based on weight, all pressures are 0.10 MPa (abs.) and all temperatures are 20° C.

EXAMPLES

Description of the Raw Materials Used in Examples 1 to 6

MQ Silicone Resin:
Vinyl-functionalized MQ silicone resin powder MQ resin 804, formed from M, M$^{vinyl}$ and Q structural units, which can be described as follows:
molecular weight: MW 5300 g/ml, Mn 2400 g/mol
vinyl content: 70 mmol of vinyl/100 g
M$^{vinyl}$/M/Q=0.09:0.72:1
Vinylpolysiloxanes:
These are vinyldimethylsiloxy-terminated dimethyl-polysiloxanes having different viscosities/chain lengths DP (Si—O units), which have been prepared by conventional processes.

| | |
|---|---|
| Vinyl polymer 1: | 1020 mPas, DP = 183 |
| Vinyl polymer 2: | 20,100 mPas, DP = 615 |
| Vinyl polymer 3: | 503,200 mPas, DP = 1830 |
| Vinyl polymer 4: | 28 × 10$^6$ mPas, DP = 6550 |

SiH Crosslinker:
The SiH crosslinker V100 is a trimethylsilyl-terminated dimethyl/methylhydrogen copolysiloxane and has a viscosity of 9 mm$^2$/s and an H content of 1.12% by weight.

Catalyst Masterbatch:
The UV light-activatable platinum catalyst is trimethyl (methylcyclopentadienyl)platinum, dissolved in vinyl-terminated polydimethylsiloxane having a viscosity of 1000 mPas, platinum concentration 300 ppm.

HDK:
HDK® SKS 300 (Wacker Chemie AG), hexamethyldisilazane-hydrophobized fumed silica having a BET surface area of 300 m$^2$/g.

Description of Extrusion and Crosslinking:
The formulations were mixed in suitable mixers or kneaders under light having a wavelength of greater than 500 nm to give a homogeneous mixture, and extruded as a one-component formulation at 25° C. through a die with diameter 2 mm onto a conveyor belt coated with aluminum foil. The conveyor belt was operated at a speed of 100 cm/60 sec.

The silicone mixture extruded onto the conveyor belt was crosslinked by means of a UV light source suspended above the conveyor belt at 25° C. The UV light source (UVASPOT 2000, from Honle) was equipped with an F radiator which emits within a wavelength range of UV light 250-400 nm. After crosslinking by means of the UV light, the silicone extrudate was wound up as a continuous extrudate.

Table 1 Containing the Examples

Examples 1-4 were inventive; vinyl polymers with various viscosities/chain lengths were used.

Example C5 was non-inventive; the material was not processable without MQ silicone resin, since it turned liquid.

Example C6 was non-inventive; example analogous to WO2009/027133 A2; there was no transparency with HDK.

TABLE 1

| | | Example | | | | |
|---|---|---|---|---|---|---|
| | | 2 | 3 | 4 | C5* | C6* |
| Composition | MQ resin 804 | 100 | 100 | 100 | 100 | — | — |
| | Vinyl polymer 1 | 60 | — | — | — | — | — |
| | Vinyl polymer 2 | — | 60 | — | — | — | — |
| | Vinyl polymer 3 | — | — | 60 | — | — | — |
| | Vinyl polymer 4 | — | — | — | 60 | 100 | 100 |
| | SiH crosslinker V 100 | 12 | 12 | 12 | 12 | 5 | 5 |
| | Catalyst masterbatch | 0.02 | 0.02 | 0.02 | 0.02 | 0.02 | 0.02 |
| | HDK | — | — | — | — | — | 30 |
| Processability Analysis | Continuous fiber production | yes | yes | yes | yes | no | yes |
| | Shore A hardness | 68 | 69 | 67 | 66 | 6 | 36 |
| | Fiber shape/ratio of height to width of the fibers | round 0.88 | round 0.90 | round 0.93 | round 0.95 | no fiber | round 0.95 |
| | 20 mm transmission at 400 nm | >88 | >88 | >88 | >88 | >88 | 59 |

*non-inventive

The invention claimed is:

1. A transparent silicone mixture crosslinkable under the influence of light, comprising
(A) at least one organosiloxane resin comprising units of the formulae I, II, III and IV $$R_3SiO_{1/2} \quad (I),$$

$$R_2SiO_{2/2} \quad (II),$$

$$RSiO_{3/2} \quad (III),$$

$$SiO_{4/2} \quad (IV),$$

in which
R are saturated hydrocarbyl radicals optionally substituted by halogens, and having 1-40 carbon atoms, —OH, or a $C_{1-10}$ alkenyl radical
with the proviso that
at least 20 mol % of the units are selected from units of the general formulae III and IV,
at least 2 of the R radicals are alkenyl radicals having 1-10 carbon atoms and
at most 2% by weight of the R radicals are —OH radicals,
(B) at least one polyorganosiloxane containing at least two alkenyl groups per molecule and having a chain length of the longest chain of 200 to 10,000 siloxy units, in an amount of from 10 to 90 parts by weight per 100 parts of organosiloxane resin (A),
(C) at least one organosilicon compound containing at least two SiH functions per molecule and
(D) as one catalyst, MeCp(PtMe$_3$) activatable by light from 200 to 500 nm.

2. The silicone mixture of claim 1, in which at least one organosiloxane resin (A) is an MQ silicone resin containing at least 80 mol % of units of the formulae I and IV.

3. The silicone mixture of claim 1, in which at least one polyorganosiloxane (B) corresponds to the average formula V $$R^1_x R^2_y SiO_{(4-x-y)/2} \quad (V)$$

in which
$R^1$ is a monovalent, optionally halogen- or cyano-substituted $C_1$-$C_{10}$ hydrocarbyl radical optionally bonded to silicon via an organic divalent group and containing aliphatic carbon-carbon multiple bonds,
$R^2$ is a monovalent, optionally halogen- or cyano-substituted, SiC-bonded $C_1$-$C_{10}$ hydrocarbyl radical free of aliphatic carbon-carbon multiple bonds,
x is a non-negative number such that at least two $R^1$ radicals are present in each molecule, and
y is a non-negative number such that (x+y) is in the range from 1.9 to 2.2.

4. The silicone mixture of claim 2, in which at least one polyorganosiloxane (B) corresponds to the average formula V $$R^1_x R^2_y SiO_{(4-x-y)/2} \quad (V)$$

in which
$R^1$ is a monovalent, optionally halogen- or cyano-substituted $C_1$-$C_{10}$ hydrocarbyl radical optionally bonded to silicon via an organic divalent group and containing aliphatic carbon-carbon multiple bonds,
$R^2$ is a monovalent, optionally halogen- or cyano-substituted, SiC-bonded $C_1$-$C_{10}$ hydrocarbyl radical free of aliphatic carbon-carbon multiple bonds,
x is a non-negative number such that at least two $R^1$ radicals are present in each molecule, and
y is a non-negative number such that (x+y) is in the range from 1.9 to 2.2.

5. The silicone mixture of claim 1, in which at least one organosilicon compound (C) has a composition of the average formula VII $$H_a R^3_b SiO_{(4-a-b)/2} \quad (VII)$$

in which
$R^3$ is a monovalent, optionally halogen- or cyano-substituted, SiC-bonded $C_1$-$C_{18}$ hydrocarbyl radical free of aliphatic carbon-carbon multiple bonds and
a and b are non-negative integers,
with the proviso that 0.5<(a+b)<3.0 and 0<a<2, and that at least two silicon-bonded hydrogen atoms are present per molecule.

6. The silicone mixture of claim 2, in which at least one organosilicon compound (C) has a composition of the average formula VII $$H_a R^3_b SiO_{(4-a-b)/2} \quad (VII)$$

in which
$R^3$ is a monovalent, optionally halogen- or cyano-substituted, SiC-bonded $C_1$-$C_{18}$ hydrocarbyl radical free of aliphatic carbon-carbon multiple bonds and
a and b are non-negative integers,
with the proviso that 0.5<(a+b)<3.0 and 0<a<2, and that at least two silicon-bonded hydrogen atoms are present per molecule.

7. The silicone mixture of claim 3, in which at least one organosilicon compound (C) has a composition of the average formula VII $$H_aR^3_bSiO_{(4-a-b)/2} \quad (VII)$$

in which

R$^3$ is a monovalent, optionally halogen- or cyano-substituted, SiC-bonded $C_1$-$C_{18}$ hydrocarbyl radical free of aliphatic carbon-carbon multiple bonds and a and b are non-negative integers, with the proviso that 0.5<(a+b)<3.0 and 0<a<2, and that at least two silicon-bonded hydrogen atoms are present per molecule.

8. The silicone mixture of claim 4, in which at least one organosilicon compound (C) has a composition of the average formula VII $$H_aR^3_bSiO_{(4-a-b)/2} \quad (VII)$$

in which

R$^3$ is a monovalent, optionally halogen- or cyano-substituted, SiC-bonded $C_1$-$C_{18}$ hydrocarbyl radical free of aliphatic carbon-carbon multiple bonds and a and b are non-negative integers, with the proviso that 0.5<(a+b)<3.0 and 0<a<2, and that at least two silicon-bonded hydrogen atoms are present per molecule.

9. A process for producing a silicone fiber, comprising continuously extruding a silicone mixture of claim 1 through a die onto a conveyor belt and vulcanizing with a UV light source having a wavelength of 200-500 nm.

10. A process for producing a silicone fiber, comprising continuously extruding a silicone mixture of claim 2 through a die onto a conveyor belt and vulcanizing with a UV light source having a wavelength of 200-500 nm.

11. A process for producing a silicone fiber, comprising continuously extruding a silicone mixture of claim 3 through a die onto a conveyor belt and vulcanizing with a UV light source having a wavelength of 200-500 nm.

12. A process for producing a silicone fiber, comprising continuously extruding a silicone mixture of claim 4 through a die onto a conveyor belt and vulcanizing with a UV light source having a wavelength of 200-500 nm.

13. A process for producing a silicone fiber, comprising continuously extruding a silicone mixture of claim 5 through a die onto a conveyor belt and vulcanizing with a UV light source having a wavelength of 200-500 nm.

14. A process for producing a silicone fiber, comprising continuously extruding a silicone mixture of claim 6 through a die onto a conveyor belt and vulcanizing with a UV light source having a wavelength of 200-500 nm.

15. A process for producing a silicone fiber, comprising continuously extruding a silicone mixture of claim 7 through a die onto a conveyor belt and vulcanizing with a UV light source having a wavelength of 200-500 nm.

16. A process for producing a silicone fiber, comprising continuously extruding a silicone mixture of claim 8 through a die onto a conveyor belt and vulcanizing with a UV light source having a wavelength of 200-500 nm.

17. The transparent silicone mixture of claim 1, wherein B is present in an amount of from 25 to 80 parts per 100 parts A.

18. The transparent silicone composition of claim 1, which has a viscosity of ≥1000 Pa·s measured at 25° C.

19. A transparent silicone mixture crosslinkable under the influence of light, comprising (A) at least one organosiloxane resin comprising units of the formulae I, II, III and IV $$R_3SiO_{1/2} \quad (I),$$

$$R_2SiO_{2/2} \quad (II),$$

$$RSiO_{3/2} \quad (III),$$

$$SiO_{4/2} \quad (IV),$$

in which

R are saturated hydrocarbyl radicals optionally substituted by halogens, and having 1-40 carbon atoms, —OH, or a $C_{1-10}$ alkenyl radical with the proviso that at least 20 mol % of the units are selected from units of the general formulae III and IV, at least 2 of the R radicals are alkenyl radicals having 1-10 carbon atoms and at most 2% by weight of the R radicals are —OH radicals, (B) at least one polyorganosiloxane containing at least two alkenyl groups per molecule and having a chain length of the longest chain of 200 to 10,000 siloxy units, (C) at least one organosilicon compound containing at least two SiH functions per molecule and (D) as one catalyst, MeCp(PtMe$_3$) activatable by light from 200 to 500 nm, wherein the transparent silicone composition has a viscosity of ≥1000 Pa·s measured at 25° C.

* * * * *